US006194709B1

United States Patent
Briggs et al.

(10) Patent No.: US 6,194,709 B1
(45) Date of Patent: Feb. 27, 2001

(54) ROTARY POSITION SENSOR/TRANSDUCER EMPLOYING ROTOR HAVING COLOR FILTERING

(75) Inventors: Roger J. Briggs, Colgate; Lawrence J. Ryczek, Oconomowoc, both of WI (US); Jean-Paul Corbier, Beausoleil (FR)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/179,020

(22) Filed: Oct. 26, 1998

(51) Int. Cl.$^7$ .............................. H03M 1/30; G01D 5/34
(52) U.S. Cl. ...................................... 250/231.14; 341/13
(58) Field of Search ................................ 250/226, 231.3, 250/231.18; 341/6, 11, 13, 31; 356/375

(56) References Cited

U.S. PATENT DOCUMENTS

| 4,020,912 | * | 5/1977 | Hino et asl. | 177/178 |
|---|---|---|---|---|
| 4,761,551 | | 8/1988 | Edwards et al. | 250/227 |
| 4,774,494 | | 9/1988 | Extance et al. | 341/6 |
| 4,947,036 | | 8/1990 | Pokorski et al. | 250/226.1 |
| 5,216,245 | * | 6/1993 | Keegan et al. | 250/226 |

FOREIGN PATENT DOCUMENTS

| EP 0 749 003 | 12/1996 | (EP) . |
|---|---|---|
| 58055802 | 2/1983 | (JP) . |

* cited by examiner

Primary Examiner—Stephone B. Allen
(74) Attorney, Agent, or Firm—Roger A. Johnston (57) ABSTRACT

A rotor disk or color wheel received on a shaft to be sensed has an annular band of dual color (red/green) filter material having opposite circumferential gradient. A printed circuit board on one axial side of the rotor disk has the dual color LED, emitting light to a reflector on the opposite axial side of the rotor disk. Some reflected light from the LED passes through the filter which transmits, according to the amount of single color filter material present at the particular rotor station to a photodetector on the circuit board. Other rays of the emitted light are reflected directly to a second detector for ambient compensation. The amount of light transmitted by the filter causes the detector current to vary the charge rate of a capacitor charged to a reference level, and when reached the LED is switched to the other of the dual color emission. The time required to charge the capacitor to the reference level determines the fraction of the duty cycle of the output signal which may be correlated with known data on the color gradient to determine the rotor angular position. A second color wheel is indexed or geared up or down as an integrator for counting the number of full revolutions of the shaft color wheel.

13 Claims, 13 Drawing Sheets

ROTARY POSITION SENSOR/TRANSDUCER EMPLOYING ROTOR HAVING COLOR FILTERING

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to sensors of the type employed for remotely determining the rotation or angular position of a rotor or shaft by providing an electrical signal indication of the rotational position of the shaft or rotor from a reference datum. The invention relates particularly to providing such a signal on a continuing basis as a transducer.

Rotary angle or position transducers are desired for various control systems; and, in one application is it desired to provide the accumulated angular rotation of a vehicle steering shaft for providing a signal indicative of the steering shaft rotation to a system employed for providing variable effort power assist to the vehicle steering system. Another use for a steering shaft position sensor is to provide a signal from which the turn signal lights may be activated and de-activated.

Angle or rotary position sensors or transducers employing optical sensing of the rotation of a rotor are known and an example of such a device is that shown and described in U.S. Pat. No. 4,947,036 issued to J. D. Pokorski, et al which describes a device utilizing a dual color light source to illuminate a rotating member which includes material providing a gradient of the two colors of the light source disposed thereon for reflection or filtered transmission, the results of which are detected by photodetectors to determine a ratio of the detected output light intensities which is compared with the known arrangement of gradient on the rotating member for determining the position of the rotating member. The aforesaid known techniques employ light beams of different wave length or color chromaticity for detecting the angular or rotary position of a moveable member. Such known devices have used photodetectors to determine the relative intensity of light of a discrete wave length or color chromaticity either transmitted through a filter or reflected from a surface having material of a discrete wave length or color chromaticity. Such known techniques of measuring reflected or transmitted light of a given color chromaticity for determining the rotary position of a member by detecting the relative intensity of the reflected or transmitted light are subject to error and suffer from a relatively low signal-to-noise ratio in the presence of spurious or stray light and to variations in the color chromaticity of the material through which the light is transmitted or reflected.

In such known arrangements, the detector voltage is proportional to the intensity of the detected light, either transmitted or reflected. It is also known to alternately direct the beams of light of a first and second color chromaticity through a filter or on a reflective material of discrete color chromaticity to the photodetector utilizing synchronized time multiplexing to produce a voltage proportional to the intensity of the received light. Typically, a microprocessor is responsive to the photodetector voltage to compute the ratio of the detector voltage arising from the alternate detection of light of the first and second color chromaticity.

In the aforesaid known techniques, proportion of the amount of light detected of one wave length or chromaticity is then correlated with a predetermined relationship between the position of the rotor and the proportion of the colored material of one chromaticity present at a particular station on the rotor. This correlation enables the detection of the rotary position of the rotor.

The known techniques for sensing the position of a rotor using light of two different wave lengths have been proven generally effective; however, where a high degree of accuracy on the order of 1° or less resolution is required, the aforesaid known techniques have been proven inadequate to provide the desired resolution. Known rotary position transducers utilizing color gradient detection have been arranged with the light source and the detectors positioned oppositely with respect to the rotor, and have thus been subject to tolerance accumulation with respect to their placement and this has resulted in variation of the sensed or detected color intensity resulting in error of the measured angle of rotation. Furthermore such known rotary position detectors have been difficult to assemble and calibrate in high volume production and thus costly for automotive steering shift position sensing applications.

In applications for sensing the rotary position of a shaft where a high degree of resolution typically less than 1° angular movement is required, for example in a device for detecting the rotary position of a vehicle steering shaft for purposes of providing a signal useable to control the variable assist in a power steering system it has been desired to provide an accurate, easy to assemble and calibrate and reliable angle sensor which is low in manufacturing cost.

BRIEF SUMMARY OF THE INVENTION

The present invention utilizes a rotor having filter material of opposite angular gradients of two different wave lengths or chromaticities on the rotor to receive and transmit light from a source of illumination alternately of light of one and then the other of the selected wave lengths or chromaticities. The results of which transmission are reflected to a photodetector providing an electrical signal indicative of the amount of light transmitted of the selected wave lengths or chromaticity. The light source preferably comprises light emitting diodes, and the photodetectors are disposed on a circuit board on a common side of the rotor; and, the reflective surface indisposed on an axially opposite side of the rotor enabling complete assembly of all electrical/electronic components on the board prior to final assembly in the housing.

The current in the photodetector is employed to modify the rate of charge of a capacitor; and, the time required for the capacitor to reach a predetermined charge or voltage level is employed to generate a pulse signal having the duration thereof corresponding to the time required to charge the capacitor, thus giving a width modulated signal indicative of the proportion of the resultant light representative of a particular station on the rotor. The proportion of light of the given wave length is then correlated with the predetermined value of the color gradient at the particular location or station on the rotor and the rotor position may thus be electrically determined.

DETAILED DESCRIPTION OF THE INVENTION

Referring to FIGS. 1 through 9, the preferred form of the invention is shown in which the sensor/transducer assembly is indicated generally at 10 and includes a housing base or shell 12 and a cover or closure member 14 which together comprise the base structure of the assembly. The cover 14 includes a tower or receptacle portion 16 which is adapted to receive an external electrical connector or plug (not shown) through aperture 18, for making electrical connection to the internal components in any convenient manner such as by pin and socket connection (not shown).

An annular rotor hub 20 has the inner periphery thereof adapted to receive a shaft, such as a steering shaft (not shown) therethrough and has means provided on the inner periphery for frictional engagement with the unshown shaft. In the present practice of the invention, it has been found satisfactory to provide resilient annular rings 22, 24 respectively received in annular grooves 26, 28 formed in the inner periphery of the hub 20, which annular rings are radially compressed upon assembly of the rotor hub 20 over the shaft to be monitored. It will be understood however, that other means of frictionally engaging the inner periphery of the rotor hub 20 with a shaft may be employed such as, for example, frictionally engaging a splined or knurled surface on the shaft or providing a key-way and key-in driving connection. Alternatively, deformable frictionally engaging surfaces (not shown) may be formed on the inner periphery of the hub to resiliently engage the shaft as the hub is received over the shaft.

The upper end 30 of the hub 20 is journalled in an aperture 32 formed in cover 14; whereas, the lower end 34 of rotor hub 20 is journalled in an aperture 36 formed in the base 12.

Rotor hub 20 has attached thereto in driving engagement an annular disk 38 which is formed of generally transparent material and which has provided about the outer periphery thereof a band of color filter material 40 which has a gradient thereon of two discrete chromaticities with the gradient, for each chromaticity varying oppositely in the circumferential direction. The band of color material 40 is thus retained between an annular member 42 and the rotor disk 38 in a sandwiched fashion. In the present practice of the invention, the rotor disk has a diameter of about 60 millimeters.

In the present practice of the invention it has been found satisfactory to form the rotor disk 38 of transparent polycarbonate plastic material with the color gradient ring 40 formed of photographic film material with the color gradient material developed on the surface thereof by techniques well known in the art. The ring 42 is received over the color gradient filter material 40 and is secured thereon by any suitable expedient as, for example, weldment or heat staking of the inner periphery of the ring 42 to the rotor disk 38. It will be understood however that other materials may be employed for the rotor disk and ring 42 and other techniques employed for securing ring 42 thereto. The color gradient material 40 may also be formed by silk screening color material on a transparent substrate; however, where a high degree of resolution, such as resolution less than 1° of angular rotation of the rotor disk 38 and particularly less than 0.1° of angular rotation is required, the use of photographic color film for the color ring 40 has been found to provide a higher degree of resolution.

In the presently preferred practice of the invention, the film ring 42 of color filtering material having a two color annular gradient is comprised of film material having a thickness of about 0.008 inches (0.20 millimeters); however, other thicknesses of film material may be employed if desired.

In the present practice of the invention, the number of pixels or dots changed in 0.1° of angular rotor movement is about 880 for a color "window" area of 6.7 mm$^2$. It will be understood however that the arrangements of and densities of color may be employed depending upon the angular resolution desired.

Referring to FIGS. 3 through 8, hub 20 has a pin 44 extending downwardly from the undersurface thereof which, once each full revolution of the hub 44, engages one of a plurality of circumferentially spaced notches or slots 46 provided in an index wheel 48. Wheel 48 has a central aperture 50 formed therein which is journalled over a stanchion 52 extending upwardly from the interior surface or bottom of base 12.

A second color wheel 54 has a central aperture 56 formed therein which is journalled for rotation over a stanchion 58 spaced from stanchion 52 and also extending upwardly from the bottom of base 12.

Color wheel 54 has a plurality of pins spaced circumferentially thereabout and extending downwardly from the undersurface thereof as denoted by reference numeral 60 which pins 60 sequentially engage one of the slots 46 upon rotation of index wheel 48. Thus, each full revolution of the hub 20 causes pin 44 to engage one of the slots 46 in index wheel 48 indexing the wheel 48 so as to cause a corresponding index movement of color wheel 44. Thus, wheel 54 is an integrator or accumulator of the number of successive full revolutions either clockwise or counter-clockwise of the hub 20.

Wheel 54 has provided on its upper surface a plurality of arcuate color segments 62 disposed and secured in a manner similar to the color film band 40 of rotor disk 38. The arcuate segments 52 being formed of film similar to band 40, but each having a uniform but discrete chromaticity as opposed to a color gradient employed on the color film band 40.

Figure 8:
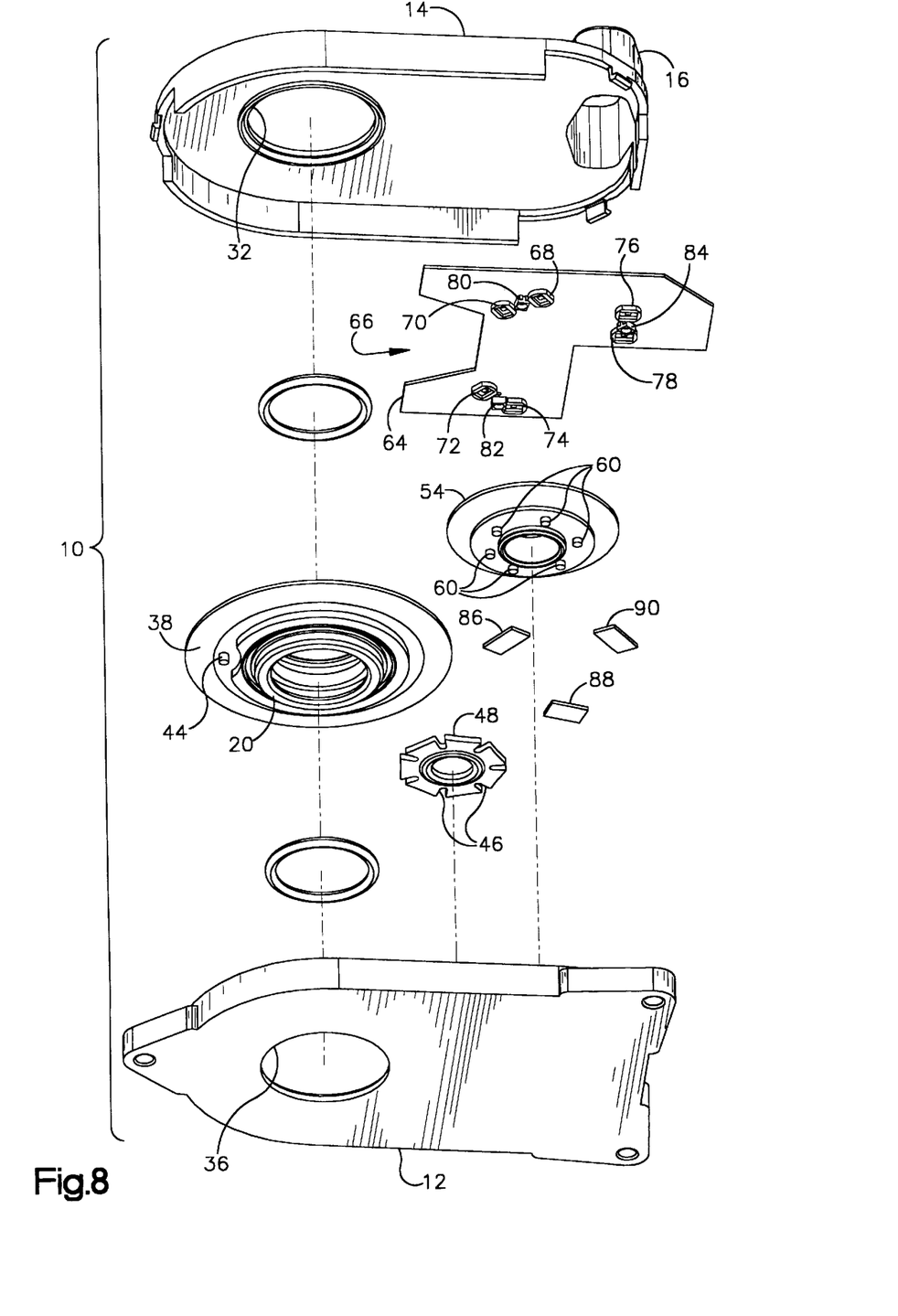
FIG. 8 is a view similar to FIG. 7 as viewed from below of the assembly of FIG. 1.
Figure 9:
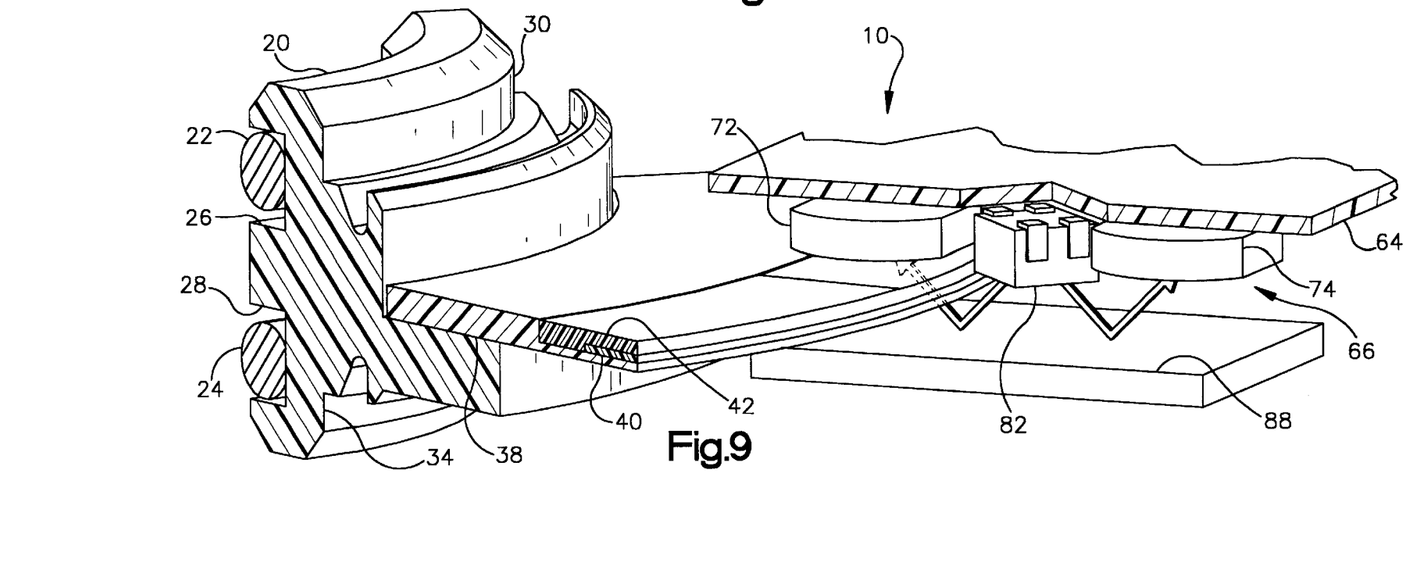
FIG. 9 is an enlarged portion of a broken-away view of the assembly of FIG. 1.

Referring to FIGS. 3 through 9, a circuit board subassembly indicated generally at 66 has a plurality of pairs of photodetectors 68, 70, 72, 74, 76, 78 disposed thereon. Each pair of photodetectors having a dual color light emitting source preferably a light emitting diode as denoted by reference numeral 80, 82, 84 disposed between the pairs as shown in FIGS. 8 and 9 on the undersurface of the circuit board 64. The pairs of photodetectors and their accompanying diode are arranged so that the pairs 68, 70 and 72, 74 are disposed about the periphery of the color band 40 with the detectors 70, 72 disposed axially adjacent the color band 40 of rotor disk 38; and, the remaining ones of the pairs, specifically detectors 68, 74 are disposed beyond the periphery of the color band 40. The diodes 80, 82 are disposed likewise radially outwardly of the outer periphery of the color band 40.

Photodetector pair 76, 78 is disposed with the detector 78 adjacent the color segment 62 on color wheel 54; and, detector 76 is disposed radially outwardly of the periphery of the color wheel 54 as is diode 84.

The printed circuit board assembly 66 is preferably attached to the undersurface of cover 14. Electrical connection to the circuit board assembly is made through aperture 18 by plug-in or pigtail connection which is omitted for simplicity of illustration.

Each pair of the photodetectors has disposed at the same station thereas, but on the opposite axial side of the rotor disk 38, a pad having the surface thereof formed as a light reflecting surface. The pads are denoted in the drawings by reference numerals 86, 88, 90 and are attached preferably to the inner surface of the base 12 with the reflective surface thereof facing upward toward the photodetectors and light emitting diodes.

Referring to FIG. 9, the path of the light from the LEDs is shown by black arrow wherein some of the light from the light emitters is reflected from the reflective surface of pad 88 and is transmitted through the color band 40 on rotor disk 38 and filtered therethrough according to the gradient of the film at the particular station on the rotor; and, the light transmitted through the filter is detected by the photodetector 72. Other rays of the light from emitter 82 are reflected in the opposite direction on reflective surface of pad 88 and do not pass through a filter but directly strike the reference detector 74. This arrangement thus provides a reference level of intensity to permit compensation for ambient conditions such as temperature, dust and moisture.

Thus, as the rotor disk 38 is rotated by the hub 20 which in turn is rotated by the shaft (not shown) the amount of red or green filtering material in the color film 40 determines the amount of red or green light transmitted to detector 72 depending on which of the two chromaticities is being emitted at a given instant of time. The electrical output of the detector 72 is then processed in a manner which will hereinafter be described to provide a correlation with the known color gradient at various stations on the rotor to thus enable a determination of the actual angular position of the rotor with respect to the stationary detector 72.

It will be understood that the wheel 54 and detectors 76, 78 operate in the same fashion, except that the color band on color wheel 54 comprises discrete angular segments, each having a uniform but discretely different chromaticity instead of the gradient employed in the color band 40 of rotor 38. The detector 76 provides an electrical output which is similar to that for detector 72 from which an angular or rotary position of color wheel 54 may be determined as will be hereinafter described and thus the number of full revolutions of the rotor 20 determined.

Referring to FIGS. 10 through 17, another embodiment of the invention is indicated generally at 100 with a base 102 and cover or closure 104 having an electrical receptacle tower 106 extending upwardly therefrom with an aperture 107 therein for receiving a plug or connector (not shown).

Figure 1:
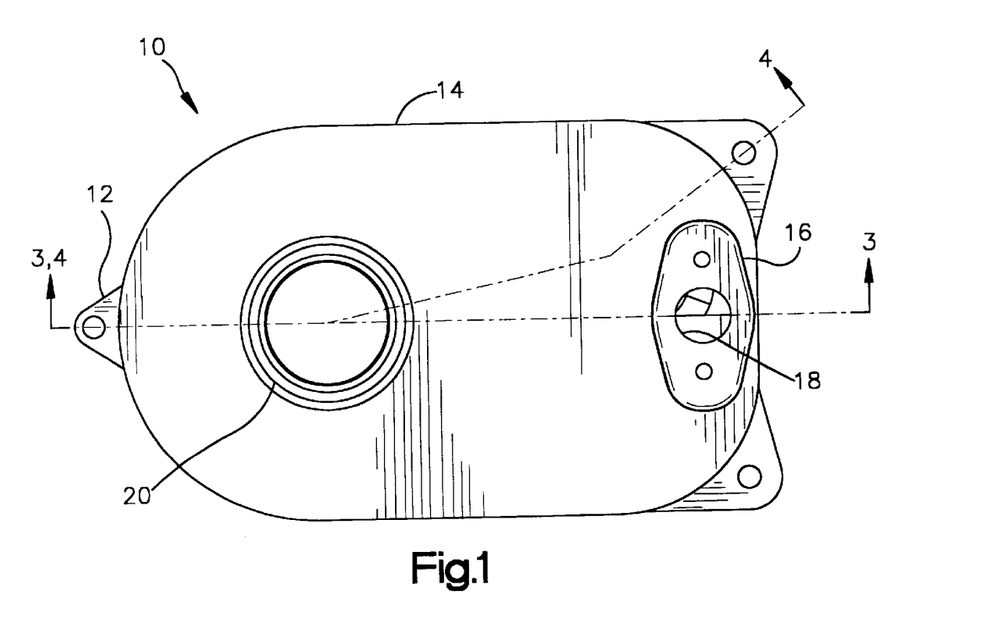
FIG. 1 is a top view of the assembled sensor/transducer in the preferred form of the present invention.
Figure 2:
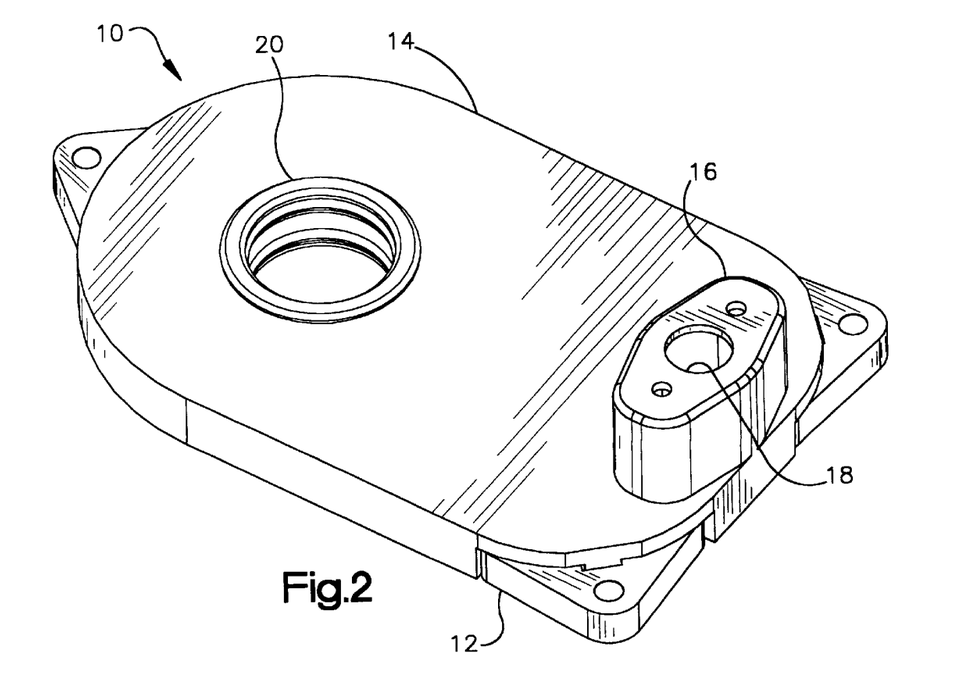
FIG. 2 is a perspective view of the assembly of FIG. 1.
Figure 3:
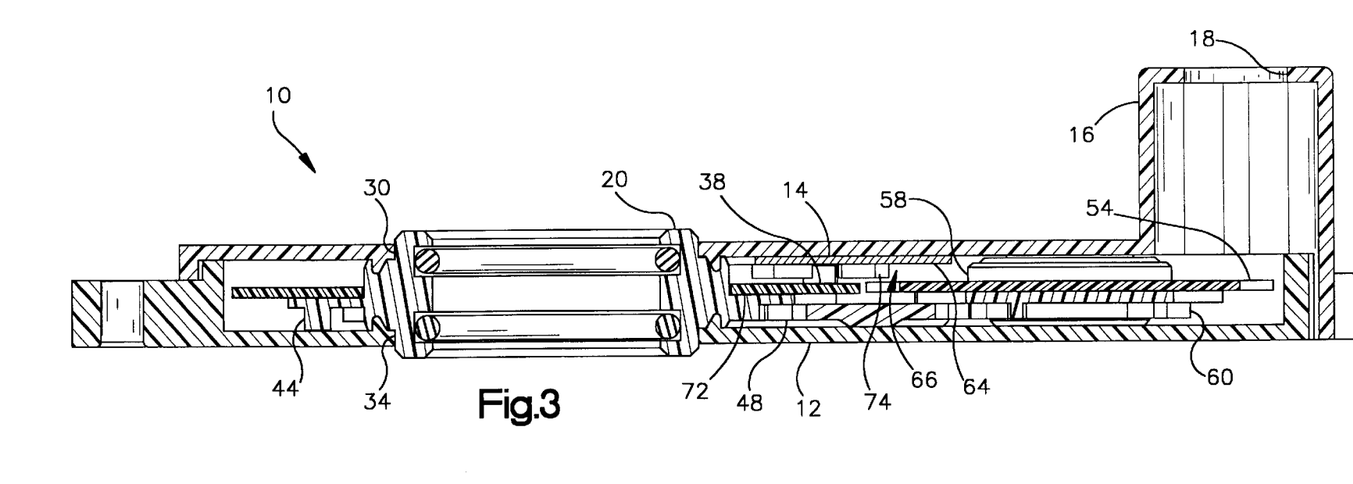
FIG. 3 is a section view taken along section indicating lines 3—3 of FIG. 1.
Figure 4:
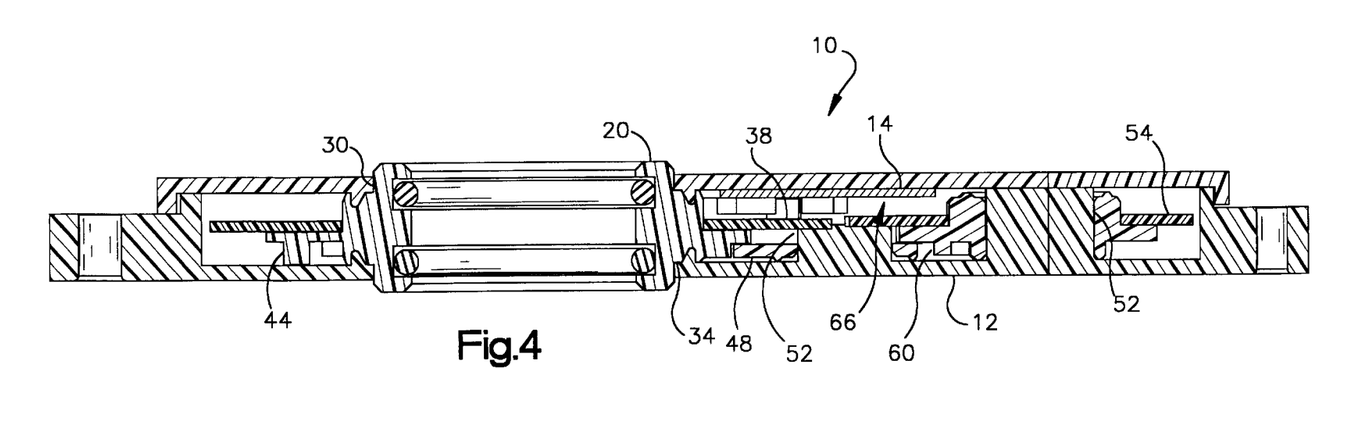
FIG. 4 is a section view taken along section indicating lines 4—4 of FIG. 1.
Figure 5:
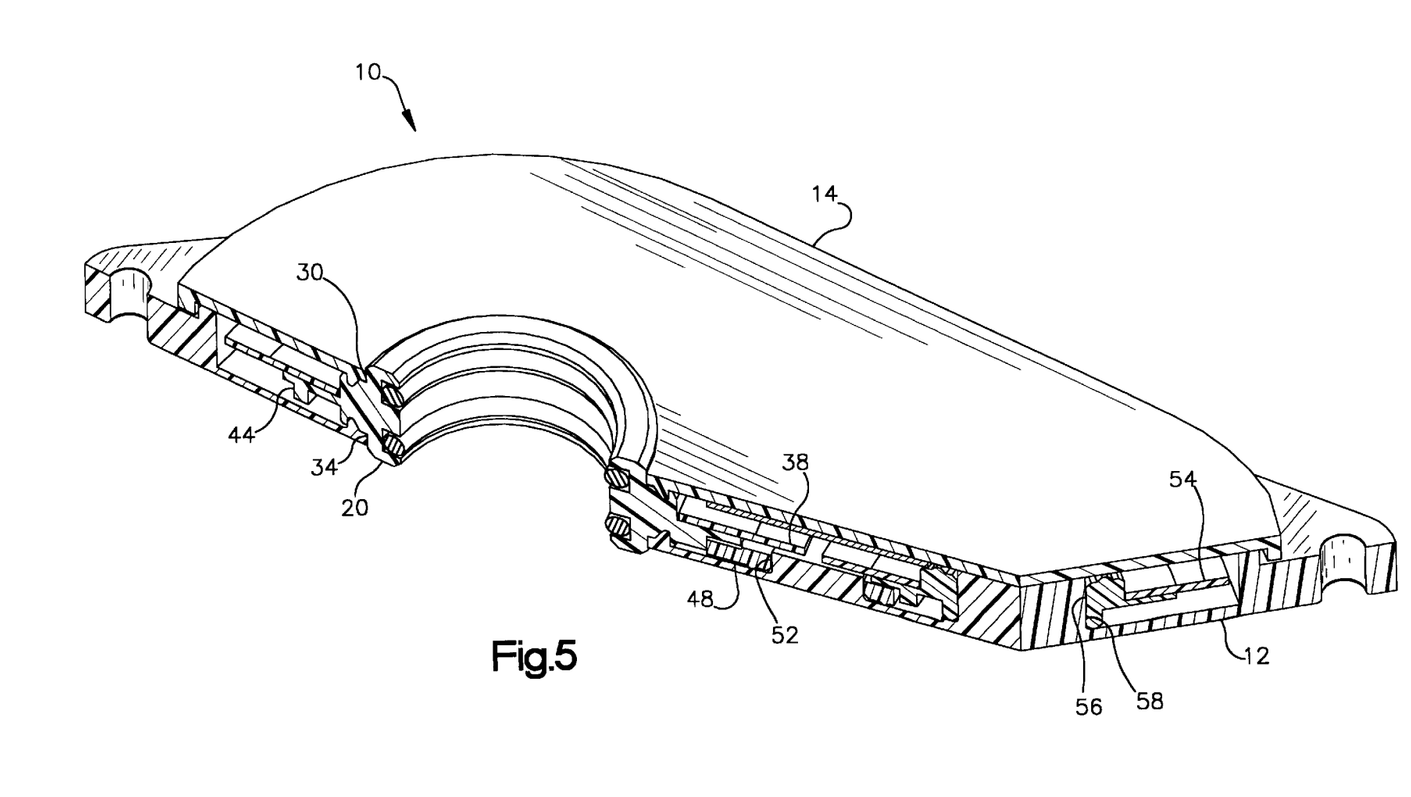
FIG. 5 is a perspective view of the sectioned portion of FIG. 4.
Figure 6:
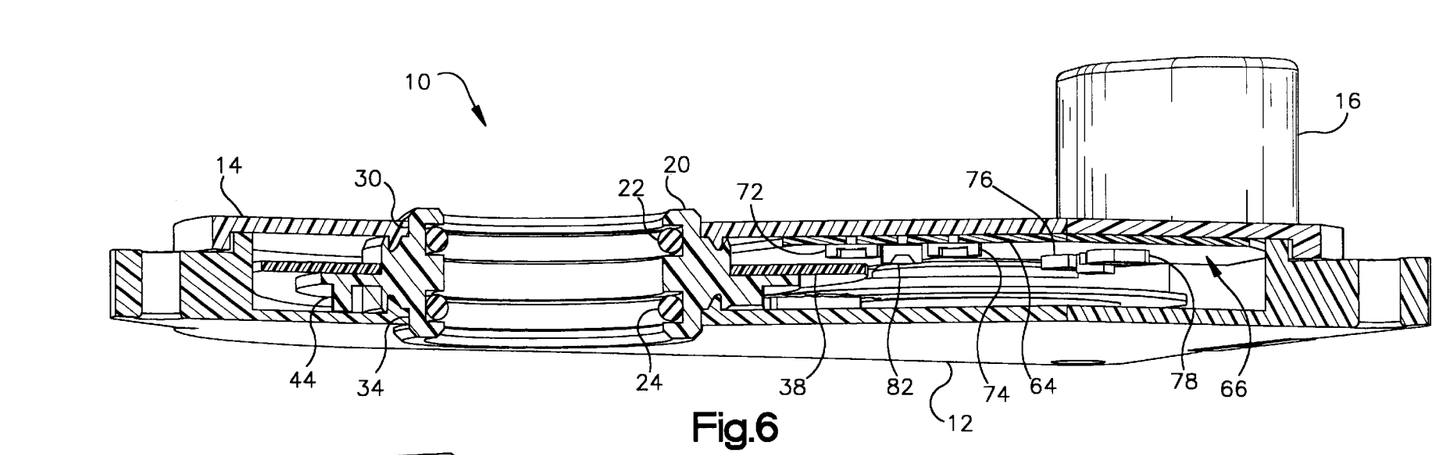
FIG. 6 is a perspective view of the sectioned portion of FIG. 3.
Figure 7:
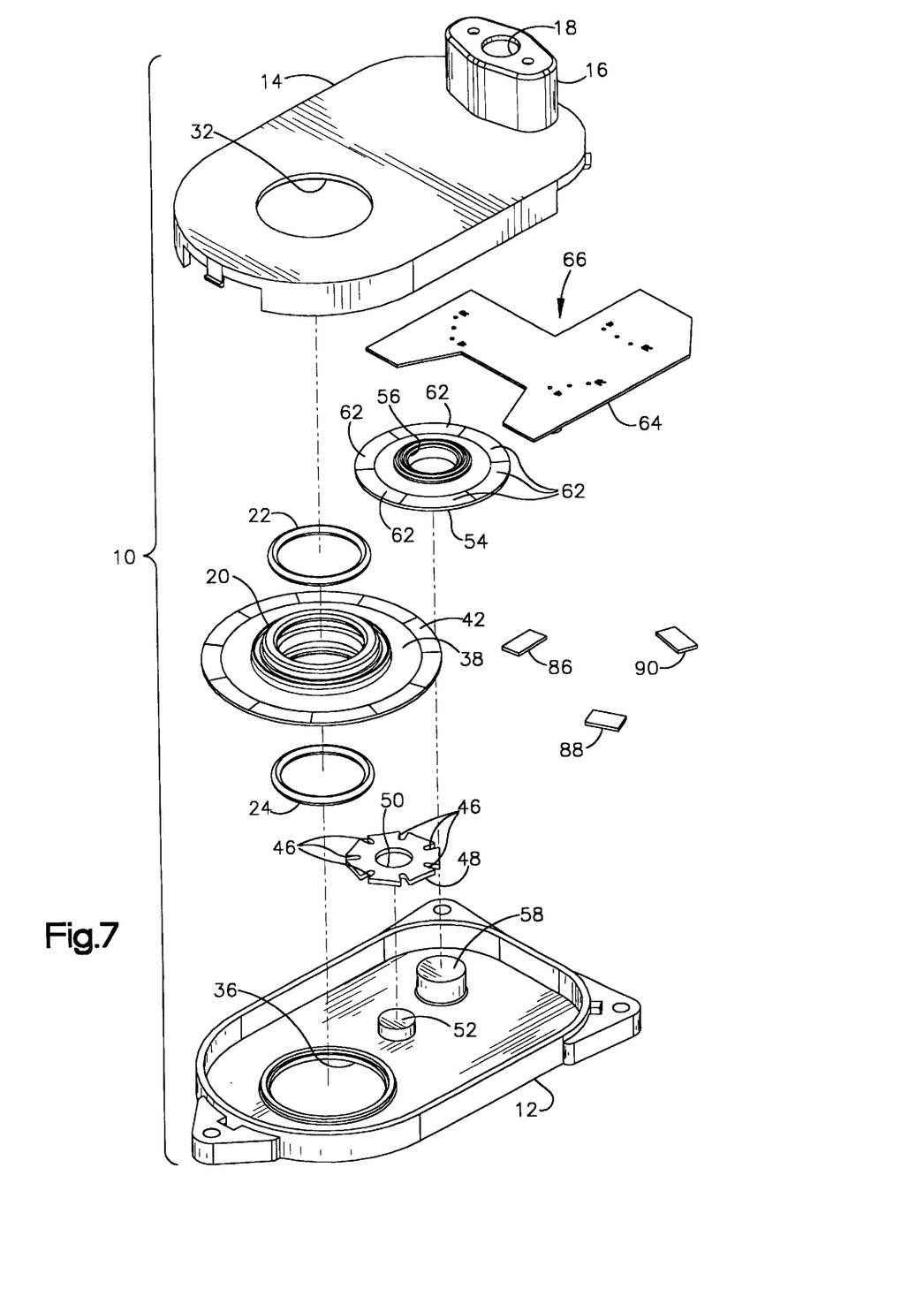
FIG. 7 is an exploded view viewed from above of the assembly of FIG. 1.

A color gradient wheel indicated generally at 108 has a hub 110 adapted to be received over a shaft (not shown) in driving engagement therewith similar to rotor hub 20 of the embodiment of FIG. 1.

The outer periphery of wheel 108 has an annular band of film developed with two discrete chromaticities thereon with angular opposite gradients similar to the band 40 on the embodiment of FIG. 1 and is indicated by dashed outline and reference numeral 112.

The hub of wheel 108 denoted by reference numeral 114 has annular grooves provided therein into which are received resilient rings 116, 118 similar to the rings 22, 24 of the FIG. 1 embodiment for providing frictional engagement with the shaft to be received through the hub. The upper end of hub 114 is journalled in an aperture 118 formed in the cover 104; and, the lower end of hub 114 is journalled in an aperture 120 provided in the base 102. The undersurface of wheel 108 includes a gear wheel having peripheral gear teeth 122 disposed therearound which are meshed with corresponding gear teeth 124 provided on ring gear 126 which is received over and journalled on a stanchion 128 extending upwardly from the interior of base 102.

A second color wheel indicated generally at 130 has a central aperture 132 which is received over and journalled on a second stanchion 134 extending upwardly from the interior of base 102 and which stanchion 134 is spaced from stanchion 128. Wheel 130 has a outer annular band of color filter material having arcuate segments of uniform but discretely differently color thereon disposed about the periphery of the wheel and denoted by reference numeral 136. Segments 136 may be formed on a single annular film band and attached in a manner similar to film band 112 on wheel 108.

The undersurface of color wheel 130 has provided thereon a gear wheel 138 having a plurality of teeth 140 disposed circumferentially thereabout and which also mesh with teeth 124 on gear wheel 126. The pitch diameters of teeth 122, 124 and 140 are chosen such that one full revolution of color wheel 108 causes color wheel 130 to rotate more or less than one full revolution.

A printed circuit board subassembly indicated generally at 142 comprises a circuit board 144 having mounted on the undersurface thereof two pairs of spaced photodetectors 146, 148 and 150, 151 with each pair having disposed therebetween a light emitting source such as an LED 152, 154 respectively.

Photodetector 146 is disposed axially adjacent the color band 112 of wheel 108; and, LED 152 and photodetector 148 are disposed radially beyond the periphery of wheel 108. Detector 148 is disposed axially adjacent the color band segments 136 of wheel 130; and, LED 154 and photodetector 150 are disposed beyond the periphery of wheel 130.

Figure 10:
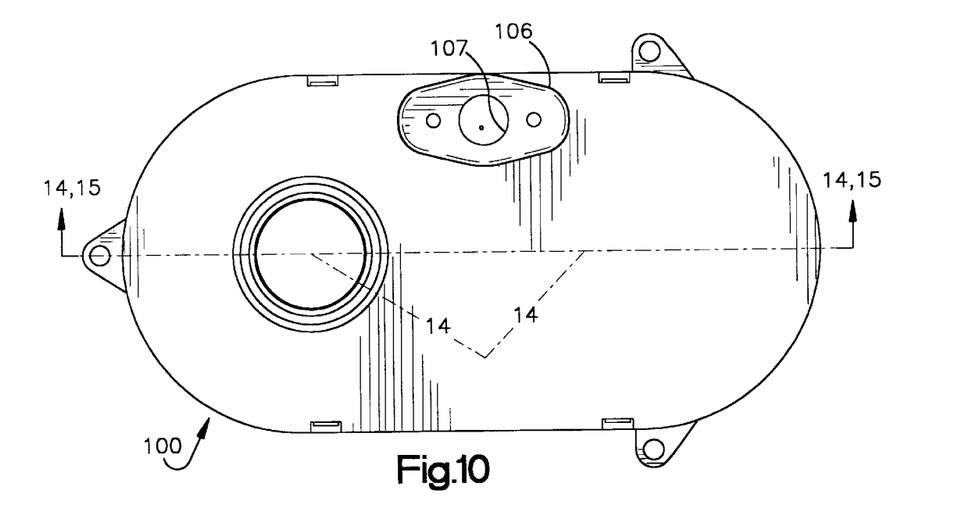
FIG. 10 is a top view similar to FIG. 1 of an alternate embodiment of the invention.
Figure 11:
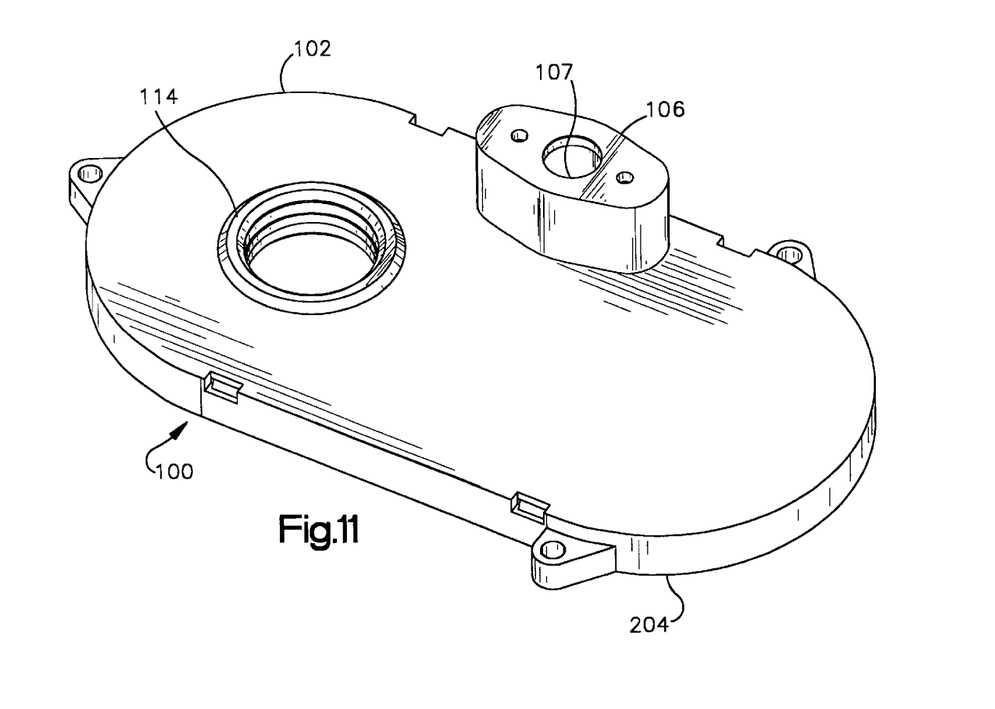
FIG. 11 is a perspective view of the assembly of FIG. 10.
Figure 12:
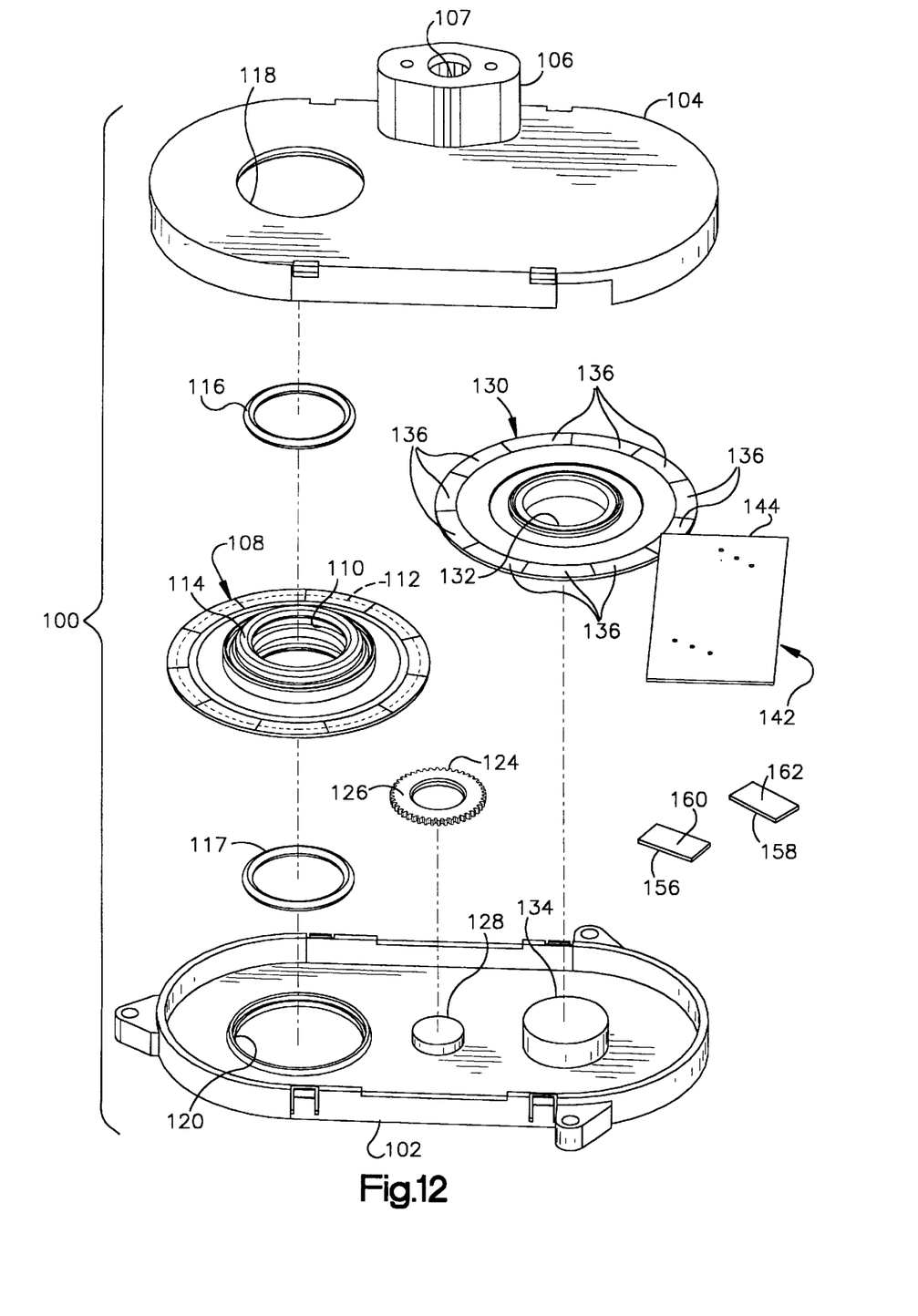
FIG. 12 is an exploded view taken from above of the embodiment of FIG. 10.
Figure 13:
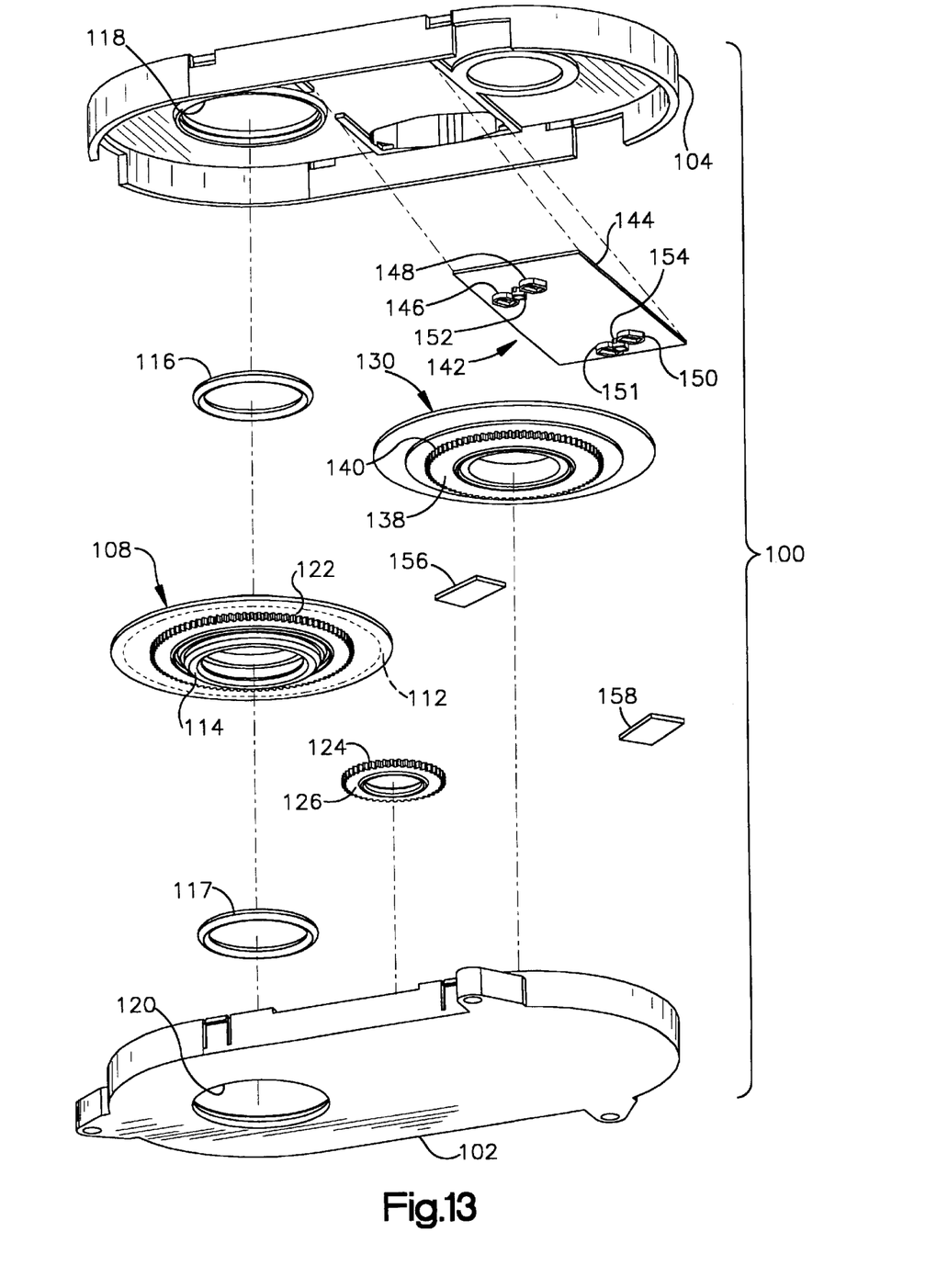
FIG. 13 is an exploded view taken from below of the embodiment of FIG. 10.
Figure 14:
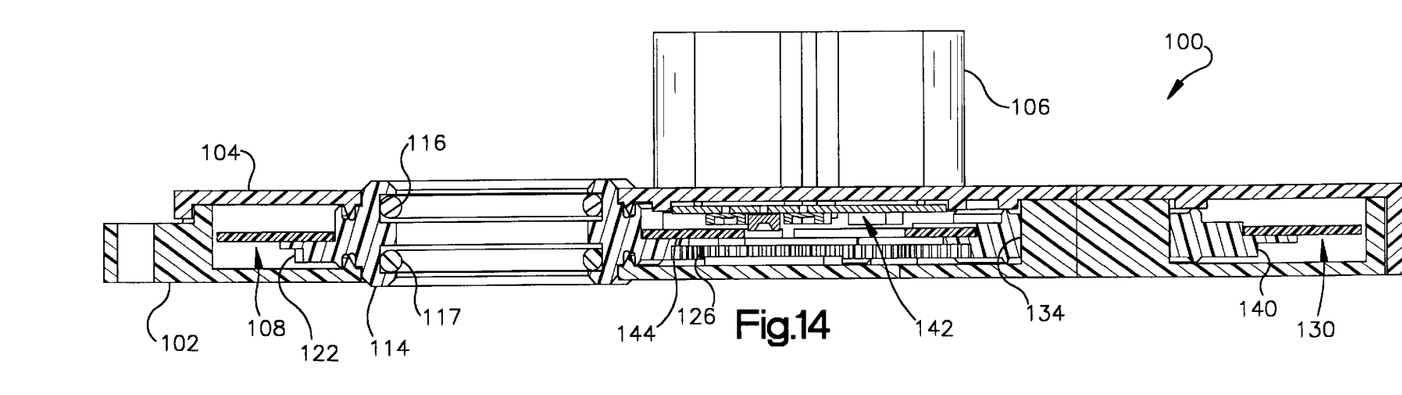
FIG. 14 is a section view taken along section indicating lines 14—14 in FIG. 10.
Figure 15:
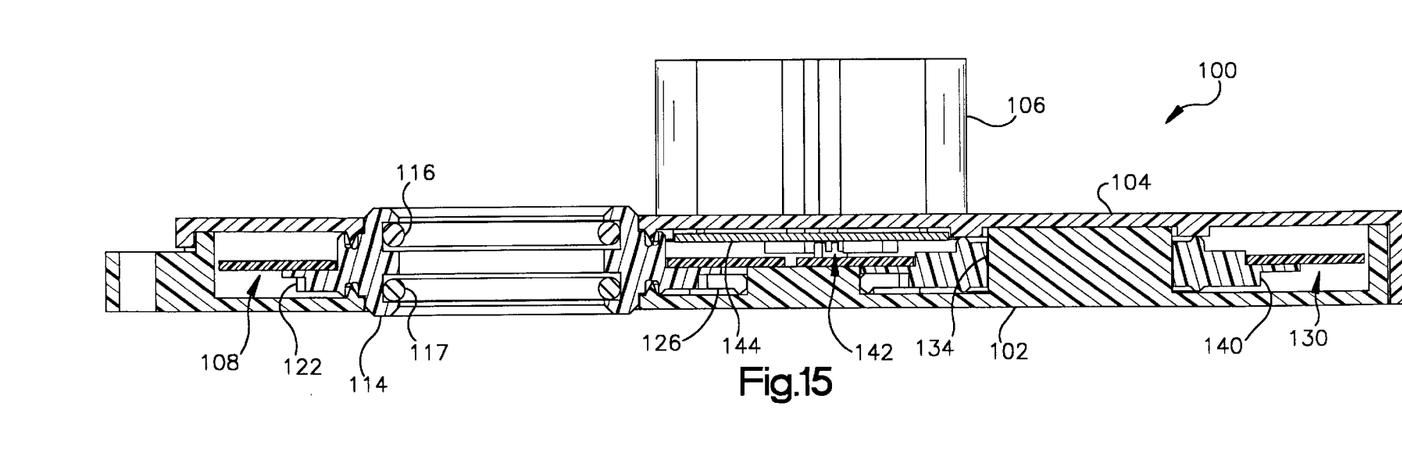
FIG. 15 is a section view taken along section indicating lines 15—15 of FIG. 10.
Figure 16:
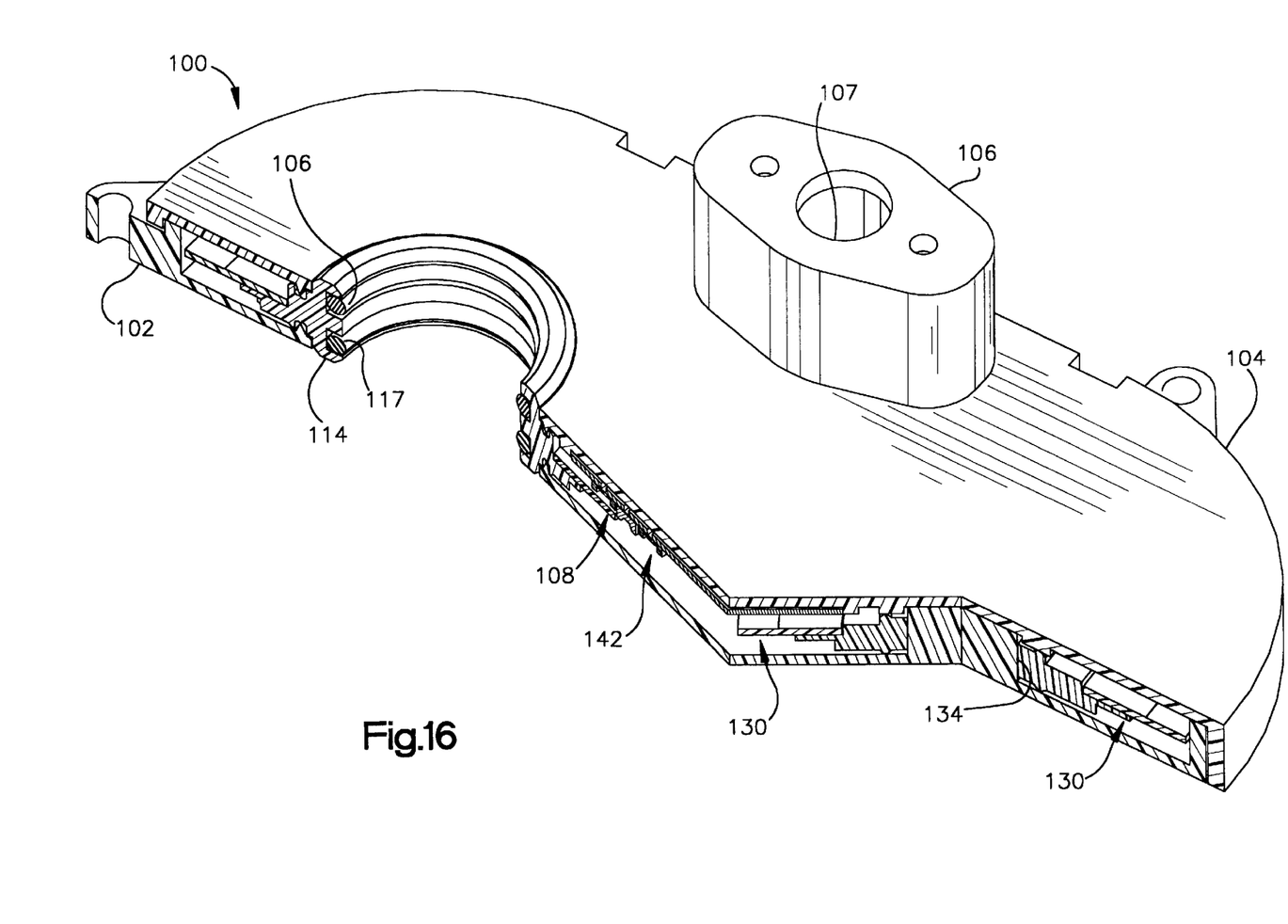
FIG. 16 is a perspective view of the sectioned portion of FIG. 14.
Figure 17:
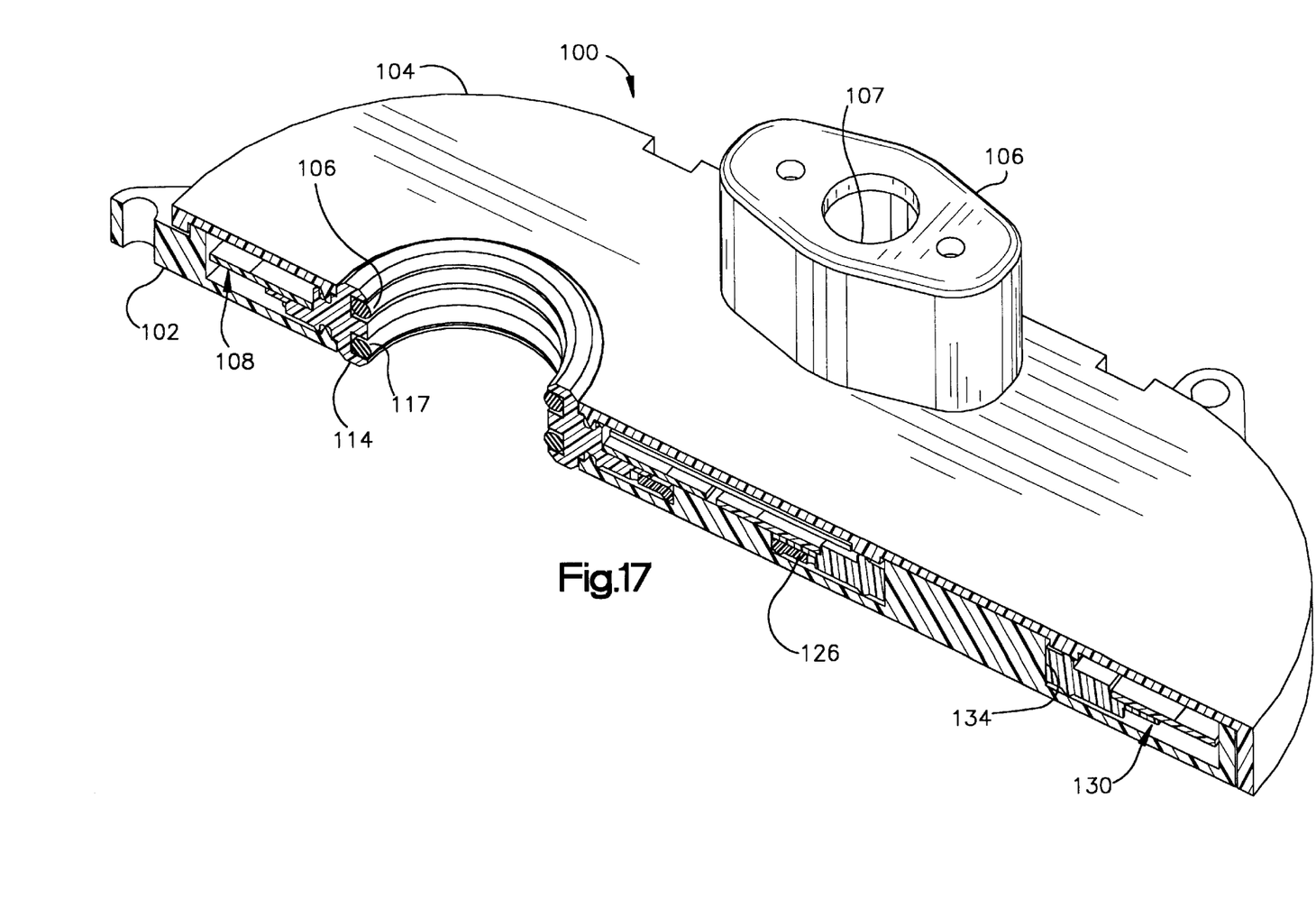
FIG. 17 is a perspective view of the sectioned portion of FIG. 15.

A pair of pads 156, 158 having reflective upper surfaces 160, 162 respectively which are disposed on the opposite axial side of the wheel 108 from the detectors so as to receive light respectively from LED 152 through filter segments 136 and directly from LED 154. It will be understood that the arrangement of the photodetectors and LEDs for the embodiment of FIG. 10 is similar to the arrangement of the embodiment of FIG. 1 as shown in detail in FIG. 9. In operation, rotation of the wheel 108 a full revolution causes a rotation of wheel 130 by more or less than a full revolution to permit the detectors to identify the angular position of wheel 130 and thus count the number of full revolutions of wheel 108.

The pads 156, 158 are preferably attached to the inner surface of the base 102. In the FIG. 10 embodiment the printed circuit board assembly 142 is preferably attached to the undersurface of the cover 104. Electrical connection is made through aperture 107 in the tower 106 of the embodiment of FIG. 10 for direct plug in connection with the printed circuit board assembly 142 or alternatively by a pigtail connector, which connection has been omitted for simplicity of illustration.

It will be understood that in both the embodiment of FIG. 1 and FIG. 10 the color filter band 40 on the rotor disk 38 and the corresponding band 112 on color wheel 108 may employ oppositely directed adjacent spirals of red and green filter material; or, alternatively may employ circumferentially varying amounts of red and green pixels at each station of the rotor such that the sum of the amount of red and green filter material at any station is substantially constant.

In operation, when the LED 82, 152 emits red light, the amount of light transmitted through the color bands 40, 112 respectively to detectors 72, 146 is dependent upon the amount of red filter material present at the particular rotor station. Similarly, when the LEDs 82, 152 emit green light, the amount of light transmitted through the filter bands 40, 112 to respectively detectors 72, 146 is dependent upon the amount of green filter material present at the particular rotor station.

In the present practice of the invention the electronic circuitry is operable to cause the LEDs to emit alternately red and green light for a period of time dependent upon the amount of red or green filter material present at a particular rotor station. The output of the detectors is then processed as a duty cycle signal. A correlation may then be made between the amount of red or green filter material present at that station and the known arrangement of the color gradient on the bands 40, 112; and, the angular rotor position of the rotor may be determined electrically in an unshown microcomputer.

Figure 18:
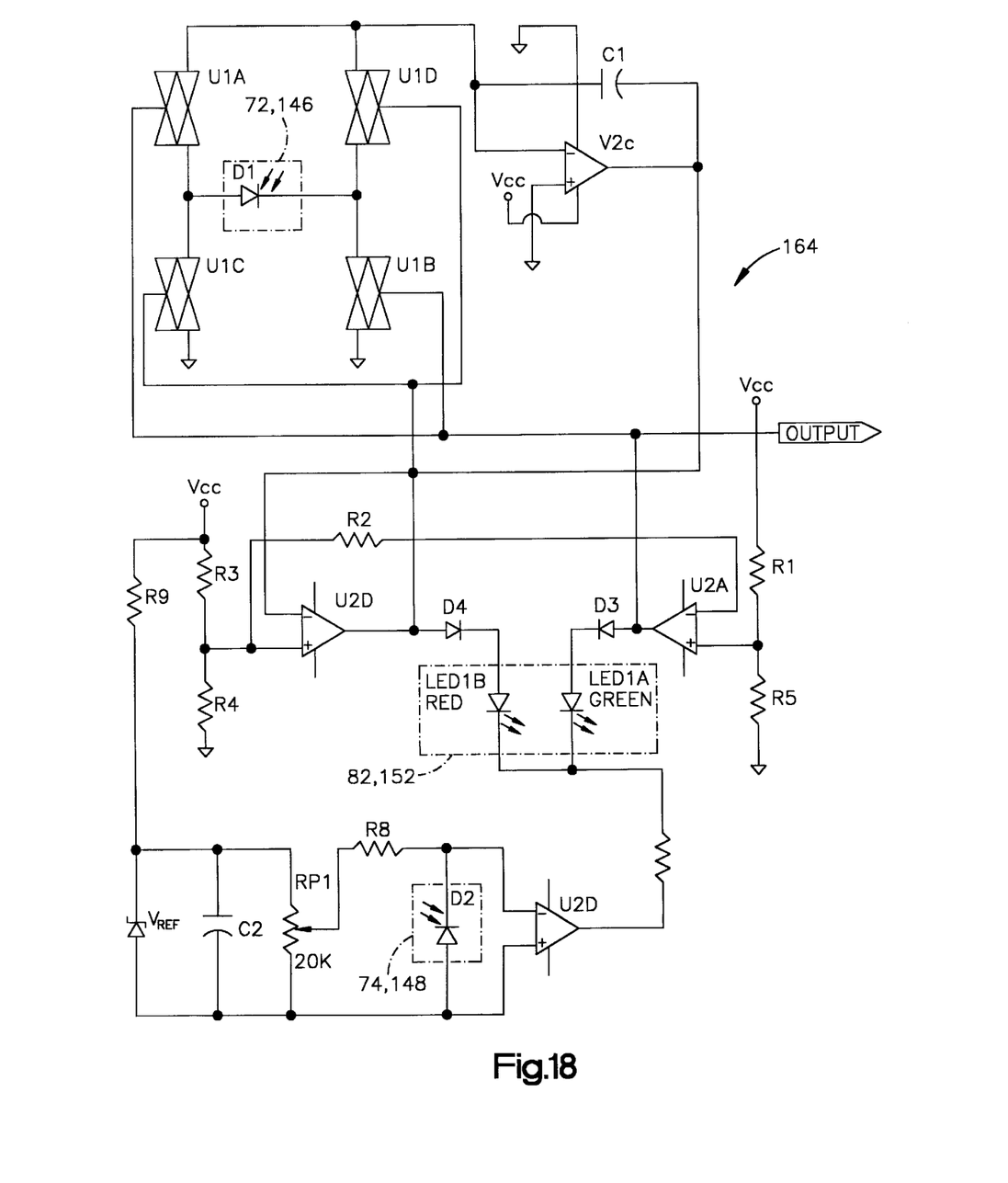
FIG. 18 is a schematic of the circuit for processing the signal from the photodetectors of the embodiment of FIGS. 1 and 10.

Referring to FIG. 18, the circuit for providing an electrical signal indicative of the rotor position is indicated generally at 164; and, it will be understood that the circuitry components are included as part of a circuit board assembly 66, 142.

Referring to FIG. 18, the light emitters 82, 152 comprise a bi-color LED 1A, 1B alternating red or green. The photodetectors 72, 146 are denoted by photo diode D1; whereas the detectors 74, 148 are denoted by photo diode D2.

Photo diode D1 receives the red or green light alternately from LED 1B and LED 1A as transmitted through the color film band 40, 112 on the rotor. The amount of light, either red or green, detected by D1 is dependent upon the amount of red and green filter material present at the particular rotor station being sensed.

U1 is a quad analog transmission gate: when U1D and U1C are "ON" red light from LED 1B causes the current in D1 to flow from cathode to anode. Integrating amplifier U2C converts this current to a positive ramp output voltage at pin 8 thereof for charging capacitor C1 which voltage is also applied to the inverting pin 6 of comparator U2B. When the ramp voltage exceeds the reference voltage at pin 5 of U2B, the output of U2B at pin 7 goes low and pin 1 of U2A goes high thereby energizing LED 1A to emit green light.

The analog switches of U1 are controlled by comparator outputs U2 pin 1 and U2 pin 7. When LED 1A is energized to emit green light, switches U1A and U1B are turned to "ON". The current in detector D1 then causes integrating amplifier U2C output pin 8 to ramp negative until pin 5 of U2B falls below the reference voltage at pin 5 U2B which is provided by voltage divider network R3, R4.

Output pin 7 of U2B goes high staring the cycle again. Resistor R2 provides for threshold hysteresis between one-third $V_{CC}$ and two-thirds $V_{CC}$ and preferably between 0.45 $V_{CC}$ and 0.55 $V_{CC}$. Diodes D3 and D4 provide for reverse polarity blocking when the supply voltage $V_{CC}$ is greater than 5 volts DC because the maximum reverse blocking voltage for the LEDs is 5 volts DC.

When a color filter such as filter band 40, 112 is interposed between LED 1 and photodetector diode D1, the ramping voltage on capacitor C1 will be slower in either the red or the green direction because one LED spectrum will be filtered more than the other. Employing a changing gradient color filter between the LEDs and D1, an output at U2A pin 1 is obtained which describes the position of the filter in terms of the fraction or percentage of the duty cycle. The frequency can be monitored as a diagnostic, for example, when the frequency is too low a dirty optical interface is indicated.

Amplifier U2D functions as an optical feedback reference amplifier. The output of U2D is controlled by the current through photodetector D2 which is also illuminated directly by LED 1. Reference voltage $V_{REF}$ supplies a current through trimmer resistor RP1 and resistor R8 to the cathode of photo diode D2 and the inverting input pin 13 of U2D. The output of U2D then adjusts LED current to force zero voltage between U2D input pins 13 and 12. The circuit then functions to force a constant LED intensity dependent only on the stable reference voltage from $V_{REF}$ and the sensitivity of diode D2 which tracks photo diode D1 over the temperature range. The photo diode reference circuit thus compensates for variations in the red and green efficiencies of LED 1A, 1B. The values of the various circuit components are indicated in Table I.

TABLE I

| Item | Quantity | Reference | Part | Source(s) |
|---|---|---|---|---|
| 1 | 1 | C1 | 100 pf | 0805CG101J9BBO |
| 2 | 3 | C2, Cx, Cy | 0.1 uf | 08052R104K8BBO |
| 3 | 5 | R1, R2, R3, R4, R5 | 100 K | P100K-CCT |
| 4 | 1 | R7 | 430 | P432-CCT |
| 5 | 1 | R8 | 5.1 Meg | RK73H2AT5114F |
| 6 | 1 | R9 | 10 K | P10.0K-CCT |

TABLE I-continued

| Item | Quantity | Reference | Part | Source(s) |
|---|---|---|---|---|
| 7 | 1 | RP1 | 0–20 K | 3224W-203E |
| 8 | 2 | D1, D2 | Photo Diode | S6838 Hamamatsu |
| 9 | 2 | D3, D4 | Diode | LL4148 Diode Incorp. |
| 10 | 1 | LED1A, LED1B | LED diode | KAA-3528ESGC |
| 11 | 1 | $V_{REF}$ | Zener diode | LM385M-2.5 |
| 12 | 1 | U1A, U1B, U1C, U1D | CD-4016-BCM | Fairchild |
| 13 | 1 | U2A, U2B, U2C, U2D | LMC6484-AIM | National Semicond |

The present invention thus provides shaft rotary angle position sensor/transducer which has high resolution, is compact, easy to manufacture in mass production, relatively low in manufacturing cost and is particularly suitable for sensing the rotary position of a motor vehicle steering shaft.

Although the invention has hereinabove been described with respect to the illustrated embodiments, it will be understood that the invention is capable of modification and variation and is limited only by the following claims.

What is claimed is:

1. A rotary position sensor for sensing the position of a shaft comprising:
   (a) a rotor disposed for rotation on a housing structure, said rotor having at least a portion thereof formed of color filtering material having transmittances of two discrete chromaticities disposed in a color gradient in a circumferential direction, said rotor having an annular configuration and adapted to have said shaft received therethrough;
   (b) a circuit board means disposed adjacent one axial side of said rotor, said circuit board means including a source of light of said two discrete chromaticities, and a photodetector spaced from said source;
   (c) said housing structure defining a reflective surface disposed adjacent an axial side of said rotor opposite said one side;
   (d) said source and said detector disposed such that said reflective surface reflects light from said source through said color gradient filter and filtered light is transmitted therefrom directly to said detector; and,
   (e) said circuit board means including circuit means operative to provide a signal indicative of the proportion of transmitted light of one chromaticity.

2. The sensor defined in claim 1, wherein said source is operative to emit light of said two discrete chromaticities in alternate sequence.

3. The sensor defined in claim 1, wherein said gradient includes a first gradient of one of said discrete chromaticities and a second dissimilar gradient of the other of said discrete chromaticities.

4. The sensor defined in claim 1, further comprising a second photodetector on said board, said second detector disposed to receive light directly from said source reflected from said reflective surface.

5. The sensor defined in claim 1, wherein said rotor has a disc-shaped configuration and said filter material comprises material selected from the group consisting of ink and film.

6. The sensor defined in claim 1, wherein said rotor has a disc-shaped configuration with said filter material disposed between two layers of translucent material.

7. The sensor defined in claim 1, wherein said source comprises red/green light emitting diodes.

8. The sensor defined in claim 1, wherein said rotor includes resilient surfaces thereon for frictionally engaging said shaft.

9. The sensor defined in claim 1, wherein said base structure includes a shell having said circuit board disposed therein with a cover received thereover, with said rotor having one end thereof journalled in said shell and another opposite end journalled in said cover.

10. The sensor defined in claim 1, further comprising a second rotor disposed for rotation on said base structure and having at least a portion thereof formed of color filtering material having transmittances of two discrete chromaticities in a circumferential direction; means operable to index said second rotor for each complete revolution of said rotor, said circuit board means including an auxiliary source of light and an auxiliary photodetector wherein light from said auxiliary source is transmitted by said filtering material on said second rotor to said reflective surface and reflected to said auxiliary photodetector; and, said circuit means is operable to determine the number of indexes from the output of said auxiliary detector.

11. A method of rotary position sensing comprising:
   (a) disposing a rotor having color filtering material thereon in an annular gradient adjacent a source of illumination and illuminating said filtering material with light of one of two discrete chromaticities;
   (b) disposing a photodetector for detecting light transmitted by said filtering material;
   (c) charging a capacitor at a rate proportional to the current in the photodetector;
   (d) timing the duration of said illumination at said one chromaticity until the charge on the capacitor reaches a reference level and switching said illumination to the other of said two chromaticities;
   (e) correlating the duration of the illumination of said first chromaticity with known values of said color gradient and determining the rotary position of said rotor.

12. The method defined in claim 11, wherein said step of illuminating includes reflecting said transmitted light to said photodetector.

13. The method defined in claim 11, wherein said step of disposing a photodetector includes disposing said detector and said source on a common side of said rotor.

* * * * *